United States Patent

Russ et al.

[11] Patent Number: 5,106,354
[45] Date of Patent: Apr. 21, 1992

[54] ONE-PIECE PLANETARY GEAR FOR A ROTARY ACTUATOR AND METHOD OF ASSEMBLING A ROTARY ACTUATOR WITH A ONE-PIECE PLANETARY GEAR

[76] Inventors: David E. Russ; David J. Lang, both c/o Sundstrand Corporation, P.O. Box 7003, Rockford, Ill. 61125-7003

[21] Appl. No.: 476,763

[22] Filed: Feb. 8, 1990

[51] Int. Cl.$^5$ .................................. F16H 1/28
[52] U.S. Cl. ........................ 475/342; 475/341
[58] Field of Search ........................ 475/341, 342

[56] References Cited

U.S. PATENT DOCUMENTS

| | | | |
|---|---|---|---|
| 3,008,355 | 11/1961 | Grudin | 475/342 X |
| 3,304,804 | 2/1967 | Oldfield et al. | 475/341 X |
| 3,633,441 | 1/1972 | Hicks | 475/342 X |
| 4,721,016 | 1/1988 | Burandt | 475/346 X |
| 4,742,730 | 5/1988 | Dorn et al. | 475/342 X |
| 4,751,855 | 6/1988 | Hudson et al. | 475/342 X |
| 4,760,964 | 8/1988 | Burandt | 475/342 |
| 4,825,723 | 5/1989 | Martin | 475/342 X |
| 4,850,247 | 7/1989 | Yu | 475/342 |
| 4,873,894 | 10/1989 | Avery et al. | 475/342 X |
| 4,932,613 | 6/1990 | Tiedeman et al. | 475/342 X |

FOREIGN PATENT DOCUMENTS 719973 2/1932 France .................................. 475/342

Primary Examiner—Leslie A. Braun
Assistant Examiner—Benjamin Levi
Attorney, Agent, or Firm—Antonelli, Terry, Stout & Kraus

[57] ABSTRACT

A geared rotary actuator (1 or 1') and method of assembling the same, with the geared rotary actuator (1 or 1') including a plurality of one-piece planetary gears (12 or 12'), each including a first set of gear teeth (19) meshing with a sun gear (11), and at least two additional sets of gear teeth (17, 18 or 17') respectively forming an inboard set of gear teeth and an outboard set of gear teeth respectively adapted to mesh with sets of gear teeth (13 or 13', 14 or 14'), of outboard and inboard ring gears. At least one tooth of the sets of gears (17, 18, 19 or 17', 19') are axially aligned along a length of the one-piece planetary gears (12 or 12') so as to enable the inboard ring to be moved axially past the outboard set of gear teeth (17 or 17') to mesh with the inboard set of gear teeth (18 or 17').

26 Claims, 10 Drawing Sheets

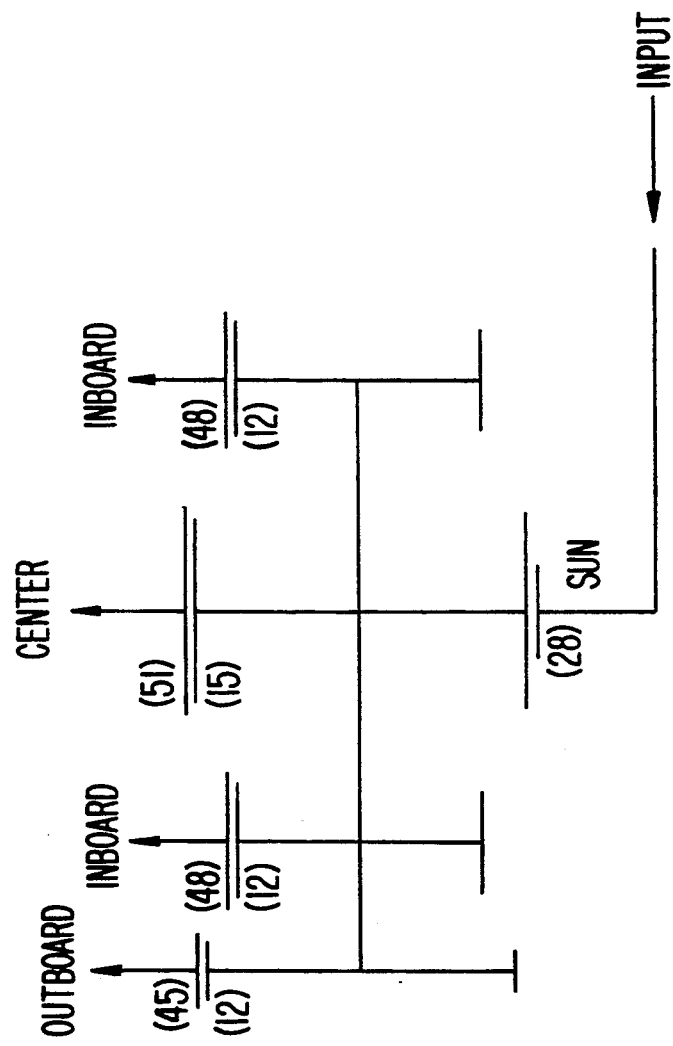

ONE-PIECE PLANETARY GEAR FOR A ROTARY ACTUATOR AND METHOD OF ASSEMBLING A ROTARY ACTUATOR WITH A ONE-PIECE PLANETARY GEAR

TECHNICAL FIELD

The present invention relates to a planetary gear arrangement for a rotary actuator and method of assembling a rotary actuator and, more particularly, to a one-piece planetary gear and method of assembling a rotary actuator utilizing the one-piece planetary gear to accommodate an inboard gear mesh between a center and outboard mesh.

BACKGROUND ART

Rotary mechanical actuators have been utilized to fold wings of military aircraft in a unique folding geometry which permits a smaller actuator package to provide an effective higher torque moment combined with maximum extension. In military aircraft such as, for example, A-6 or A-12, a wing fold geometry having a fold angle of about 167° is required, with the rotary actuator utilizing counter rotating output arms combined with linkages that can extend to more than twice an original envelope, that is, the actuator arms rotate 366° for a 167° rotation of a wing resulting in approximately a two-to-one mechanical torque advantage, thereby resulting in a lower weight since weight of the actuator is in proportion to a torque.

Rotary actuator systems generally include a valve, hydraulic motor, hydraulic brake, simple and differential planetary gear assembly as well as a stop means.

The differential planetary gear assembly for the rotary actuator system generally incorporates two different gear ratios, with the first ratio resulting in a negative value between large arms of the actuator and the center portion of the actuator while a second ratio results in a positive value between the small arms and center portion of the actuator. Consequently, in the proposed rotary actuator systems, with respect to the center portion of the actuator, the smaller side arms rotate in one direction while the larger arm rotates in an opposite direction, with the gears in the differential planetary gear arrangement being cageless and balanced.

Moreover, geared rotary actuator generally only have one mesh on either side of a center gear mesh. During assembly, the planet gears are positioned around the support rings, and the ring gears are slid into place over the planet/support ring assembly. To facilitate assembly, a pitch diameter on the center mesh is larger than a pitch diameter of the end mesh.

If an additional gear mesh is added to one side of the center mesh, assembly problems arise. More particularly, if the inboard mesh pitch diameter must, for some reason, be smaller than the outboard mesh and center mesh, the inboard mesh ring gear could be prevented from sliding over the outboard planet gears due to the larger outboard pitch diameter.

One disadvantage in planetary gear arrangements for rotary actuator systems of the aforementioned type resides in the fact that the planetary gears are splined in the actuator. The splines lengthen the actuator to provide a sufficient torque carrying capability; however, lengthening of the rotary actuator adds to the weight. Additionally, the provision of splined connections is expensive by virtue of the required machining operations for the planetary gears and the spline shaft.

U.S. Pat. No. 4,721,016 proposes a multi-staged geared rotary actuator for positioning aircraft flight control surfaces such as, for example, leading edge flaps, wherein a support of axially-aligned tubular planet gear shafts in successive stages is achieved by means extending through the axially-aligned tubular planet gear shafts which supports the ends of the planet gear shafts and reacts against bending forces applied to the ends of the tubular gear shafts to reduce deflection and maximize gear mesh of gears carried on the planet gear shafts for maximum torque transmission.

While the above-proposed multiple-stage geared rotary actuator is effective for advantageously controlling a positioning of aircraft flight control surfaces, the proposed actuator is not faced with any assembly limitations in spite of the use of a multi-partite planetary gear construction.

A compound gear arrangement is proposed in U.S. Pat. No. 4,751,855, also intended for use as a geared hinge for aircraft, each comprising a plurality of substantially axially aligned gear trains each having two relatively rotatable output ring gears surrounding a sun gear input element and two planet gear elements, with the planet gear elements being coupled for rotation in unison by the sun gear element and meshing with respective ones of the ring gears. The sun gear elements of adjacent gear trains are drivingly coupled by a means which permits an axial misalignment between the sun gear elements.

While the above-proposed compound gear arrangement solves a flexibility problem, by virtue of the proposed constructional features, no particular assembly problem exists in the proposed compound gear arrangement.

DISCLOSURE OF INVENTION

The aim underlying the present invention essentially resides in providing a one-piece planetary gear for a rotary actuator and a method of assembling a rotary actuator utilizing a one-piece planetary gear which avoids, by simple means, shortcomings and disadvantages encountered in the prior art and which facilitates the assembly of a geared rotary actuator.

In accordance with the present invention, a geared rotary actuator is provided which includes a sun gear coupled to a driven shaft, with a one-piece planetary gear means being provided and including a first mesh or set of gear teeth meshing with the sun gear in addition to at least two additional gear mesh or sets of gear teeth forming an inboard and outboard gear mesh, and with at least one tooth of each of the sets of gear teeth on the one-piece planetary gear means being axially aligned along the one-piece planetary gear means. An inboard ring gear is provided having a first operating pitch diameter including teeth meshing with the gear teeth of the inboard mesh, and an outboard ring gear having a second operating pitch diameter, larger than the first pitch diameter, is provided with gear teeth meshing with the outboard gear mesh.

In accordance with the method of assembling a rotary geared actuator in accordance with the present invention having a sun gear, a plurality of one-piece planet gear means having a set of gear teeth meshing with the sun gear, and at least two additional sets of gear teeth, with at least one tooth of the gear teeth sets being axially aligned along inboard and outboard gear teeth sets of the additional sets of gear teeth, and with a first ring gear having a first operating pitch diameter which has teeth meshing with the inboard set of teeth and a second ring gear having a second operating pitch diameter larger than the first diameter having gear teeth meshing with the outboard set of gear teeth, a plurality of the one-piece planet gears are aligned with the aligned teeth in a position such that the aligned gear teeth are in a mesh position with the ring gears, a first ring gear is axially moved past the outboard set of gear teeth to mesh with the inboard set of gear teeth, and the second ring gear is moved axially to mesh with the outboard set of gear teeth. The first, second and third ring gears are provided with a suitable modified tooth profile so as to enable the teeth of the ring gear to be slid past the respective set of teeth of the planet gears.

By virtue of the above-noted features of the rotary actuator and method of assembling the same in accordance with the present invention, it is possible to ensure that the planets are positioned around the support rings in such a manner that the ring gears can be readily slid into place over the planet/support ring assembly without any danger of the inboard mesh ring gear being prevented from sliding over the outboard planets due to the larger outboard pitch diameter.

The rotary actuator and method of assembly of such rotary actuator is readily applicable to any situation wherein the actuator has a torque input on a sun gear and a plurality of planet gears, with each planet gear having a plurality of gear mesh.

Moreover, it is not necessary in accordance with the present invention to have an identical number of teeth on the planet gears or the ring gears at the outboard or inboard positions as long as there is meshing between the respective sets of gear teeth.

Additionally, the planetary gears may, in a conventional manner be provided with a carrier; however, such carrier is not necessary.

Additionally, by virtue of the features of the present invention, the one-piece planetary gear assembly may be provided with a constant number of teeth or a variable number of teeth for planet gear or the ring gears.

The above and other objects, features and advantages of the present invention will become more apparent from the following description when taken in connection with the accompanying drawings which show, for the purpose of illustration only, several embodiments in accordance with the present invention.

BRIEF DESCRIPTION OF THE DRAWINGS

FIG. 5A is a schematic view of a planetary gear arrangement of a rotary actuator of FIG. 4 with a one-piece planetary gear constructed in accordance with the present invention;

BEST MODE FOR CARRYING OUT THE INVENTION

Figure 1:
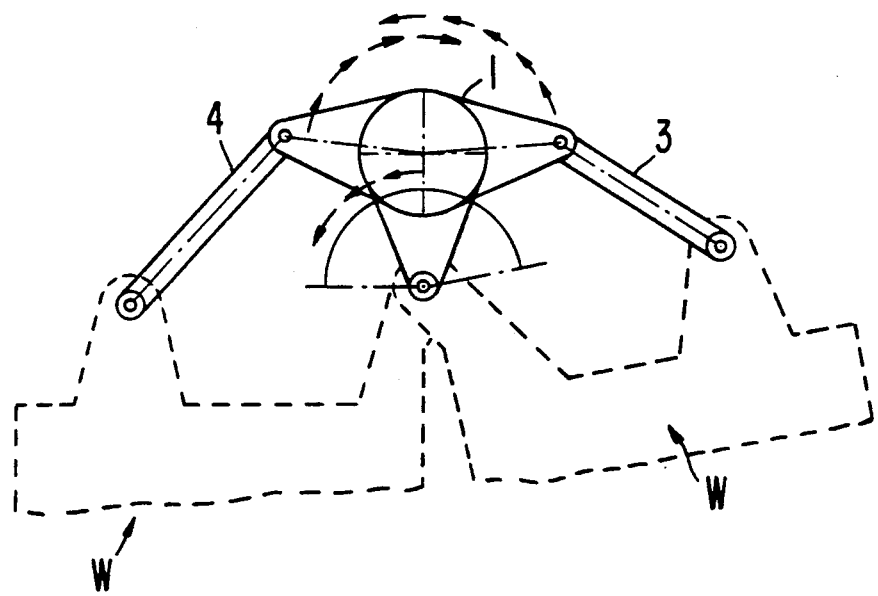
FIG. 1 is a schematic view of a rotary actuator for folding wings of an aircraft, with the wings in a folded condition.
Figure 2:
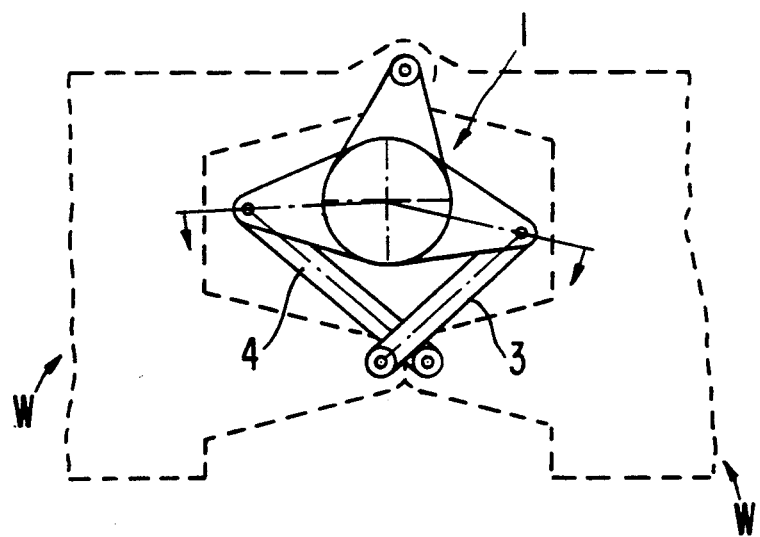
FIG. 2 is a schematic view of the rotary actuator of FIG. 1 with the wings in a spread position.

Referring now to the drawings wherein like reference numerals used throughout the various views to designate like parts and, more particularly, to FIGS. 1 and 2, according to these figures, a rotary actuator generally designated by the reference numeral 1 for enabling, for example, a folding of a wing structure generally designated by the reference character W of aircraft such as, for example, an A-6 or A-12 aircraft, is mounted on the wing structure W, in a conventional manner, whereby the wing structure W is displaceable from a folded position (FIG. 1) to a spread position (FIG. 2). A linkage system including, for example, link members 3, 4 are interposed between the rotary actuator 1 and the wing structure W for transmitting a rotary motion of the rotary actuator 1 to the wing structure W to enable a folding and unfolding of the wing structure W.

Figure 4:
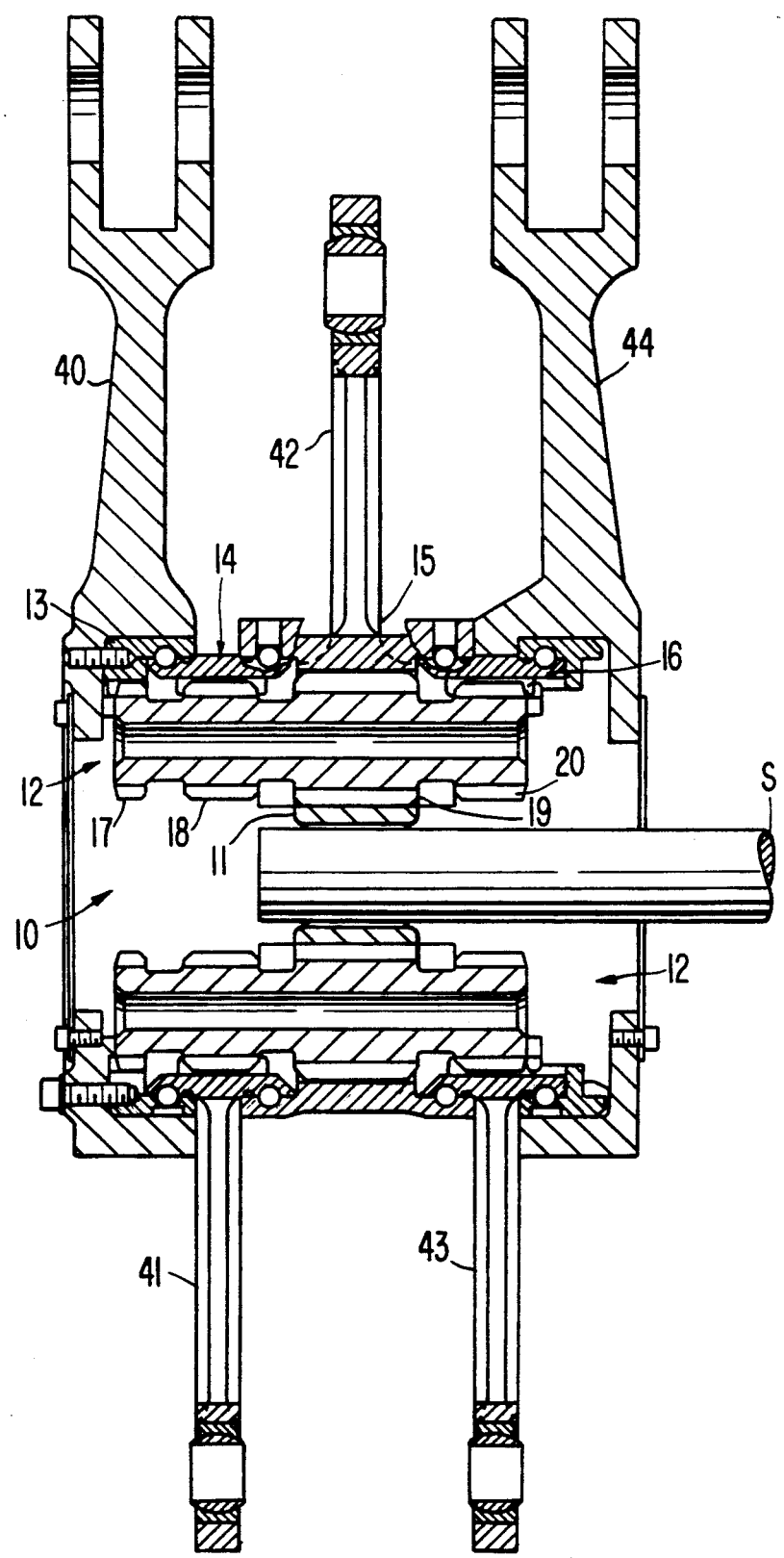
FIG. 4 is a schematic axial cross-sectional view of the rotary actuator of FIG. 3 with one ring gear being rotatably displaced for clarity.

As shown in FIG. 4, the rotary actuator 1 includes a differential gear assembly generally designated by the reference numeral 10 comprising an input means such as, for example, a shaft S, a sun gear 11, a plurality of one-piece planetary gears generally designated by the reference numeral 12, a plurality of ring gears 13, 14, 15, 16, respectively meshing with gear teeth 17, 18, 19, 20 provided on each of the planetary gears 12.

Figure 3:
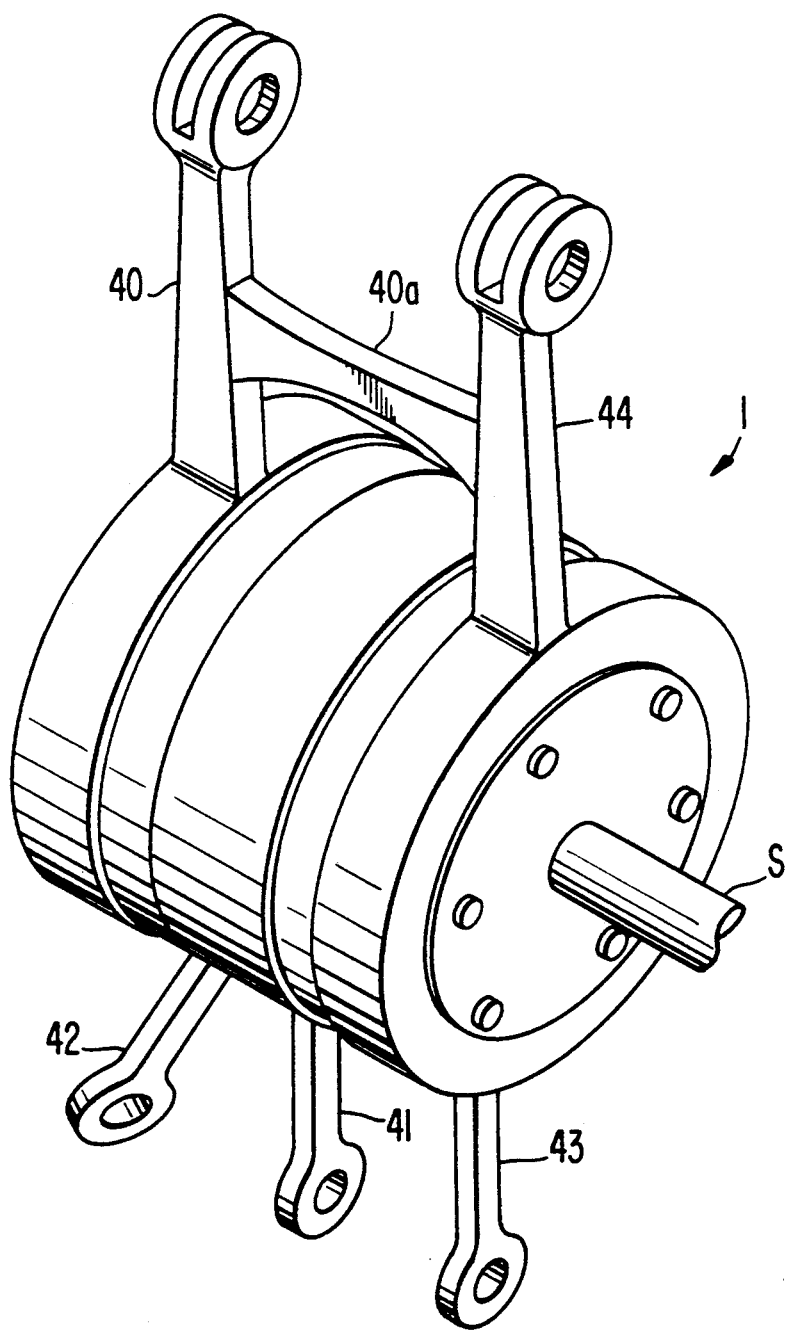
FIG. 3 is a schematic perspective view of a rotary actuator constructed in accordance with the present invention.

The differential gear 10 in FIG. 4 drives link members 40, 41, 42, 43, 44 by way of the planetary gears 12 and sun gear 11, with the link member 40 being suitably secured by, for example, bolt means (not shown) with the wing structure at inboard and outboard positions of the wing structure in a conventional manner. The link members 41, 43 drive the outboard wing structure to fold the same up past a vertical position, with the link member 42 being connected in a conventional manner to the inboard wing structure, and the link members 40 and 44 forming a conventional hinge point for the wing structure. As shown in FIG. 3, the ink members 40 and 44 are connected to each other by a tie bar 40a.

The geared rotary actuator of FIGS. 3 and 4 is a standard GRA configuration with an additional set of gear teeth or gear mesh provided at the ring gear 13 and acting as a ground for the planetary system.

Figure 5:
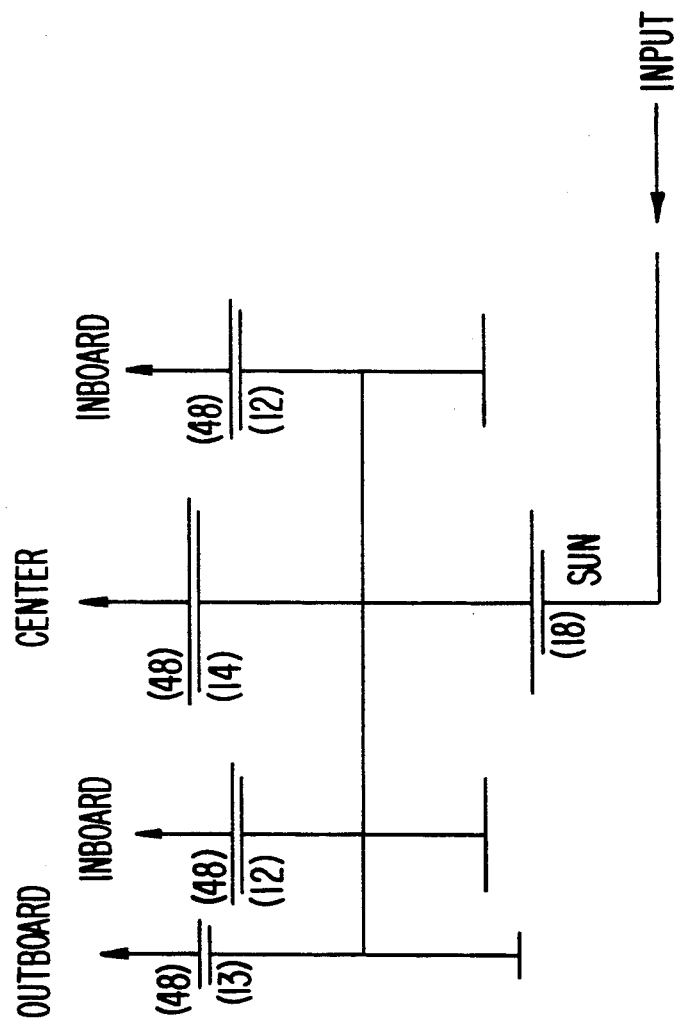
FIG. 5 is a schematic view of a planetary gear arrangement of the rotary actuator of FIG. 4 with a one-piece planetary gear constructed in accordance with the present invention.

As shown in FIG. 5, wherein the number of gear teeth for the respective center, inboard, and outboard gear mesh are parenthetically indicated, the center mesh has one more tooth than the outboard mesh of the planet and the inboard mesh planet has one less tooth. By virtue of the fact that the ring gear 13 acts as a ground for the planetary system, the center ring gear 15 is caused to travel in the opposite direction from the inboard ring gears 14, 16.

As shown most clearly in FIG. 5, the inboard gear meshes have a smaller operating pitch diameter than the center gear mesh and the outboard gear mesh and the operating pitch diameter of the center mesh must be larger than the outboard mesh for the ring gear 15 to travel in the opposite direction to the ring gears 14, 16 thereby creating the assembly problem of trying to push a smaller operating pitch diameter of the ring gears 14, 16 over the larger operating pitch diameter of the outboard mesh.

Figure 6:
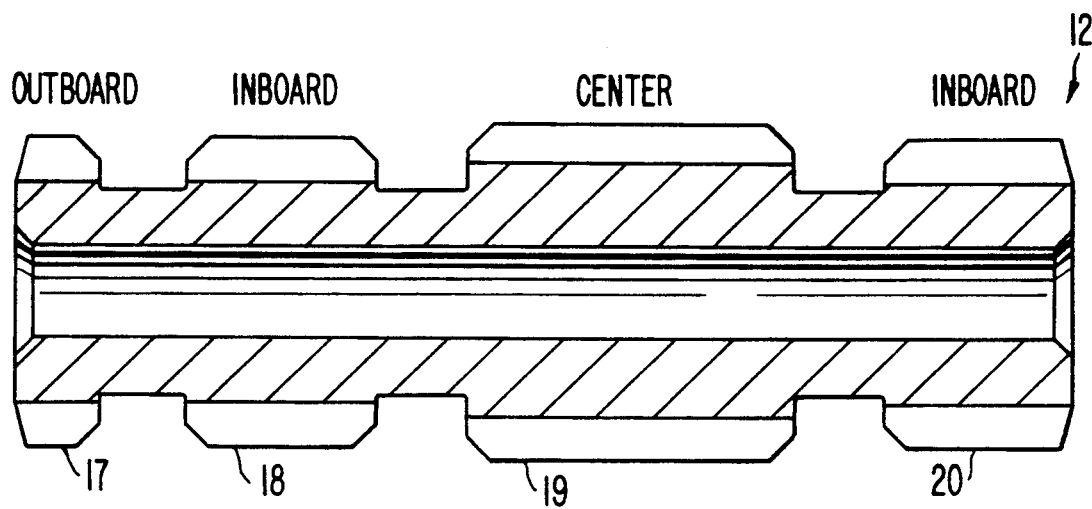
FIG. 6 is a cross-sectional view of the one-piece planetary gear constructed in accordance with the present invention.
Figure 7:
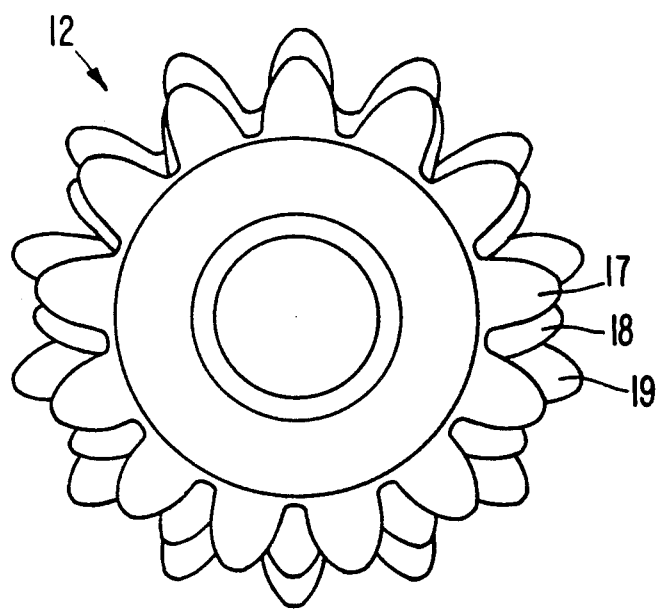
FIG. 7 is an end view of the one-piece planetary gear of FIG. 5.

While traditionally this problem has been solved by providing a two-piece planetary gear construction, in accordance with the present invention, each of the planetary gears 12 is fashioned as a one-piece planetary gear including a plurality of gear meshes or sets of gear teeth 17, 18, 19, 20 as shown most clearly in FIGS. 6 and 7.

To ensure assembly of the geared rotary actuator in accordance with the present invention, the number of gear teeth on each ring gear 13, 14, 15, 16 must be the same so that the gears can align for assembly in the preferred embodiment. Moreover, the number of teeth on the sun gear 11 must follow the standard GRA assembly rule, namely:

$$(N_1 + N_2) \div N_p = INTEGER$$

where:
$N_1$ = number of teeth of center ring gear;
$N_2$ = number of teeth of sun gear; and
$N_p$ = number of planets.

Additionally, as shown in FIG. 7, at least one tooth of each of the sets or mesh of gear teeth along an entire length of the planetary gear 12 must be in alignment. Additionally, the inboard gear mesh and outboard gear mesh tooth profiles must be modified so that the inboard ring gear 14 or 16 can slide past the outboard planet tooth.

In the illustrated example of FIG. 5, the same pitch gears were chosen for the inboard and outboard gear meshes. Using standard gear proportions, the inboard ring gear pitch diameter would have been the same as the outboard pitch diameter. Standard gear modifications for tight centers are applied so as to obtain the same center distances for all meshes as much as practicable without violating any good design constructions. Since the operating pitch diameter diminishes proportionally to the correct value, by a careful selection of the original tooth form, the final outboard planet tooth form will be smaller than the inboard planet tooth form and other tooth form modifications also satisfy this requirement.

As can readily be appreciated, the number of teeth shown in FIG. 5 is merely for illustrative purposes, and if the above noted criteria are met, gear assemblies with different number of teeth will also assemble equally well and, for example, as shown in FIG. 5A, the number of teeth of the set of gear teeth of the center ring gear may be greater than the number of teeth in the outboard ring gear. Furthermore, by careful selection of the geometry of the respective teeth, it may be possible to utilize the same cutter for both inboard and outboard planetary teeth in some instances. Moreover, while FIGS. 4 and 5 provide an example of a rotary actuator wherein an outboard mesh is provided only on the left side of the figure, it is also possible in accordance with the present invention to provide a second outboard mesh to the right of the respective figures.

Figure 8:
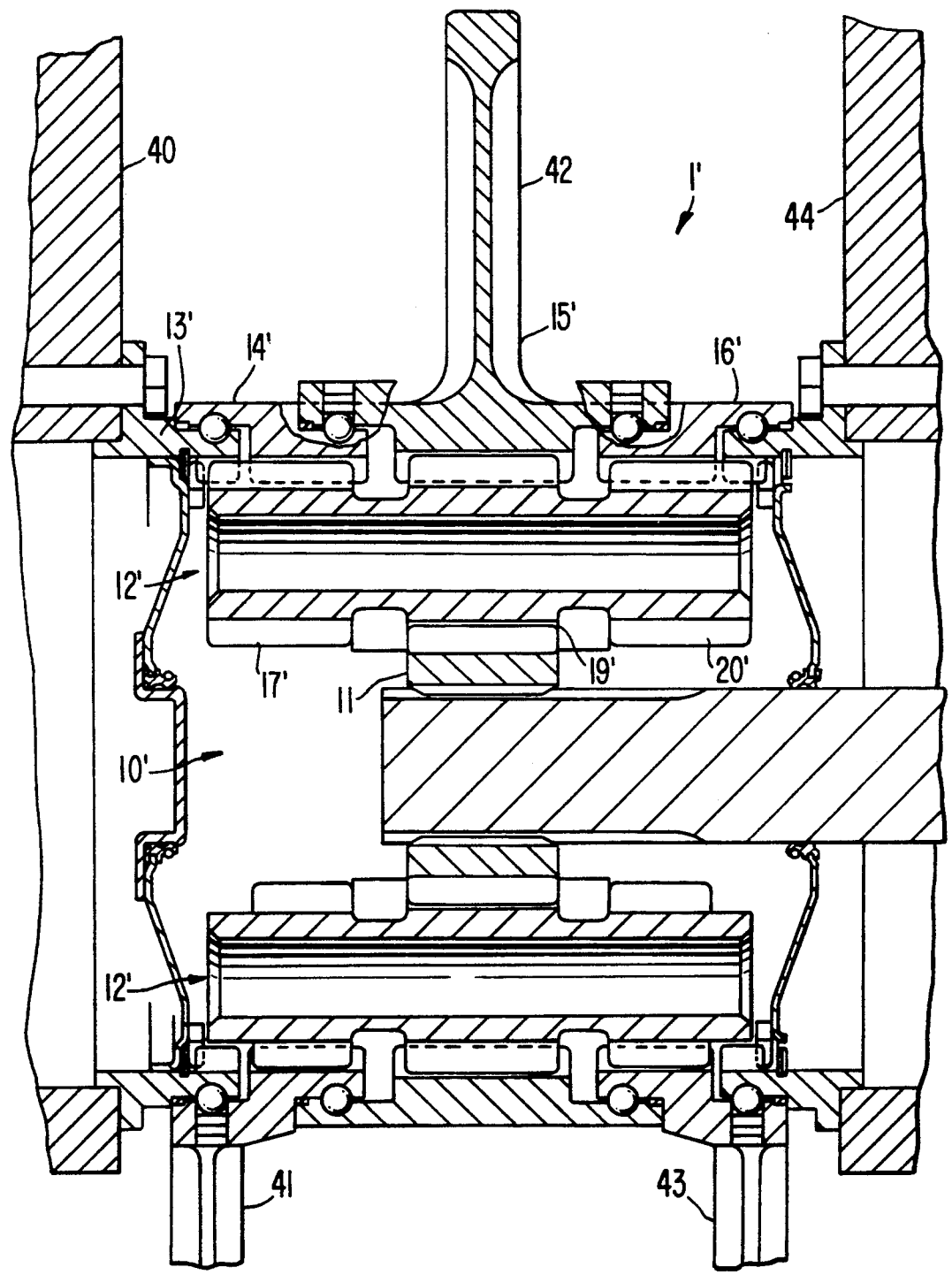
FIG. 8 is a schematic axial cross-sectional view of another embodiment of a rotary actuator constructed in accordance with the present invention employing a one-piece planetary gear.
Figure 9:
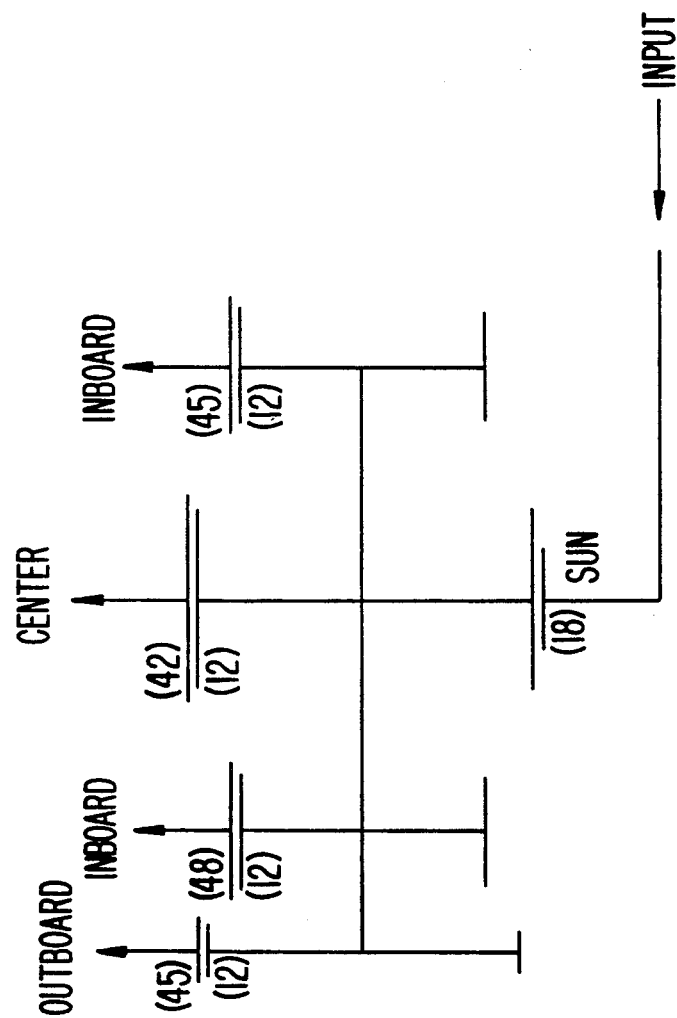
FIG. 9 is a schematic view of a portion of a planetary gear arrangement of the rotary actuator of FIG. 8 with a one-piece planetary gear constructed in accordance with the present invention.

Alternatively, as shown most clearly in FIGS. 8 and 9, a rotary actuator generally designated by the reference numeral 1' may be provided wherein a differential gear assembly generally designated by the reference numeral 10' comprises a sun gear 11, a plurality of one-piece planetary gears generally designated by the reference numeral 12', and a plurality of ring gears 13', 14', 15', 16' respectively meshing with gear teeth 17', 19' and 20' provided on each of the planetary gears 12'. The rotary actuator 1' differs from the rotary actuator 1 in that the number of teeth of the respective ring gears 13', 14', 15', 16', as parenthetically shown in FIG. 9 differ while the number of gear teeth of the respective sets of gear teeth on the one-piece planetary gear 12' are the same. Additionally, to facilitate manufacturing of the planetary gear 12', the inboard and outboard sets of gear teeth 17' are fashioned as continuous to the structure, i.e., having an axial length enabling engagement with the ring gears 13', 14'; however, such continuous gear mesh is not necessary. Moreover, to obtain the gear ratio illustrated in FIG. 9, outboard planetary teeth in the three of the six planetary gears 12' were removed for assembly limitations. However, other tooth numbers would not require such removal.

Figure 10:
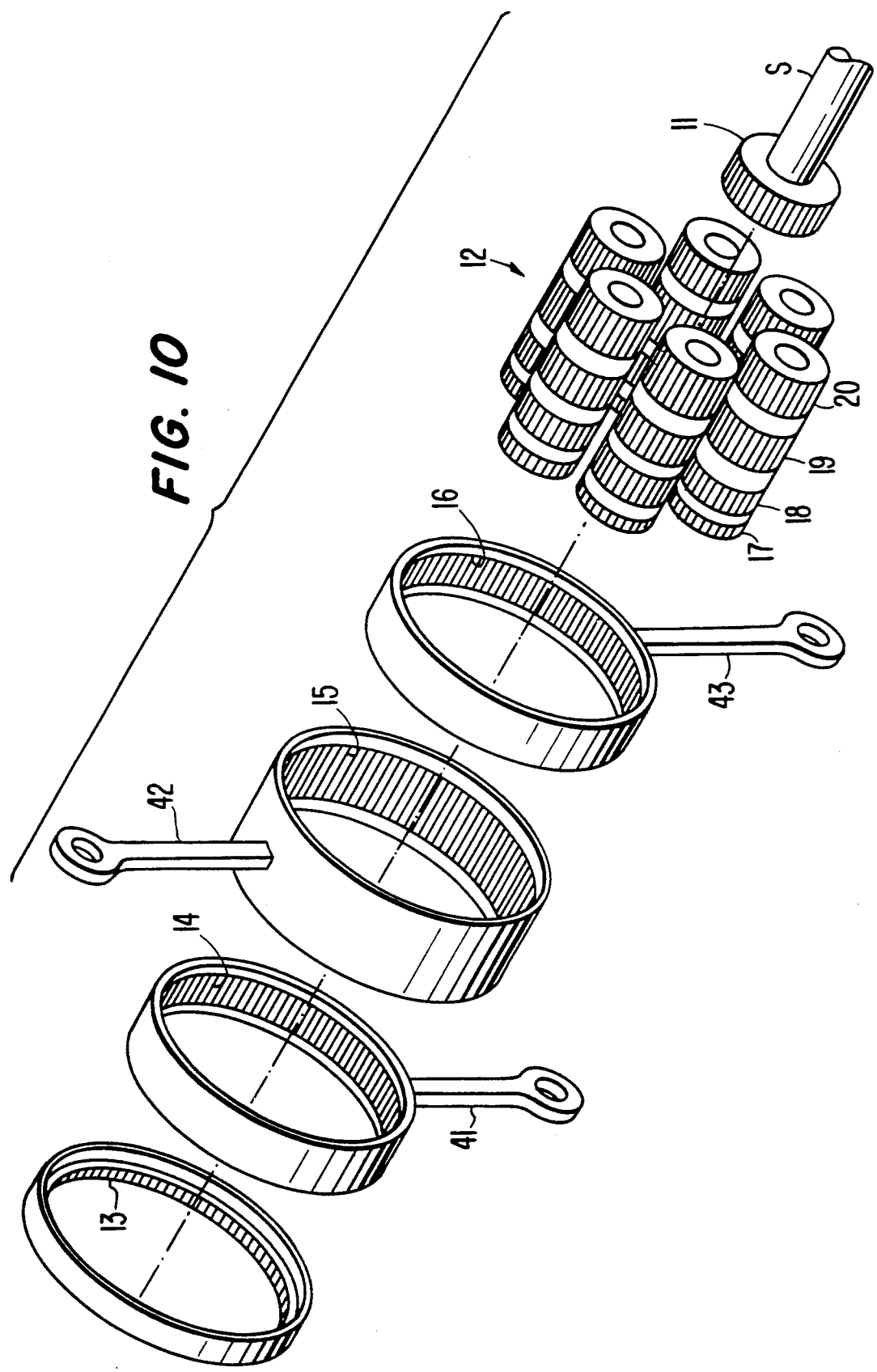
FIG. 10 is an exploded view of a planetary gear assembly employing the one-piece planetary gear of the present invention.

As shown in FIG. 10, in assembling the rotary actuator 1, in accordance with the method of the present invention, the planetary gears 12 are arranged about a circumference of the sun gear 11 securely mounted on the shaft S, with the assembled cluster of planetary gears 12 and sun gear 11 being held in a proper positional relationship by suitable conventional means such as, for example, a planet support (not shown). The plurality of the one-piece planetary gears 12 are positioned such that the at least one aligned gear tooth of each of the sets of gear teeth 17, 18, 19, 20 are in a mesh position with respect to the ring gears 13, 14, 15, 16.

Figure 11:
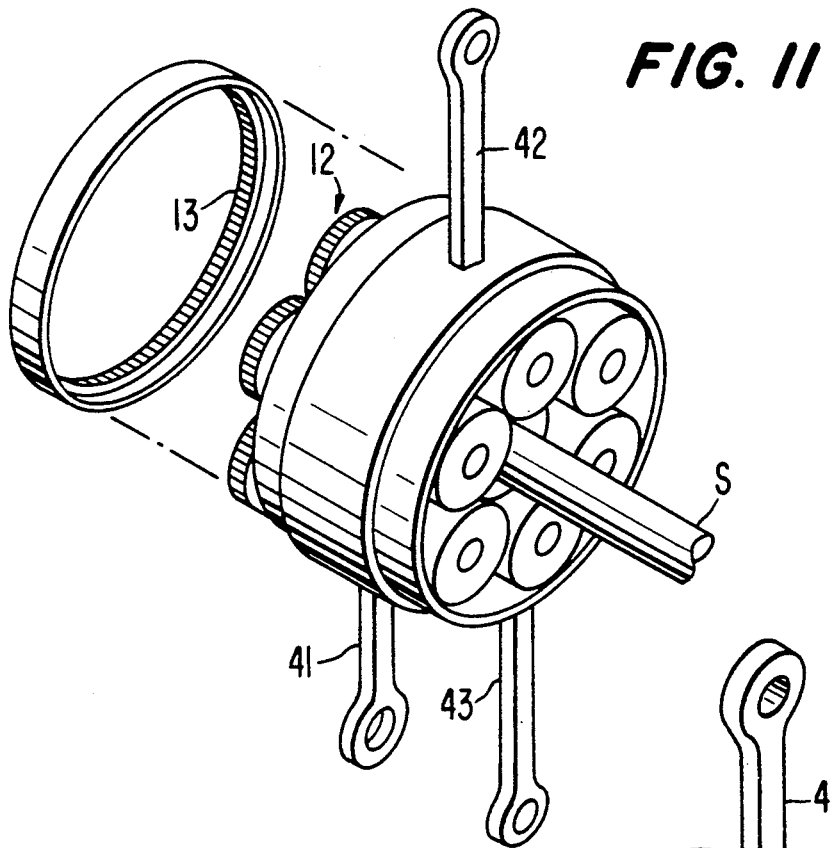
FIG. 11 is an exploded view of a planetary gear assembly of FIG. 9 with the first ring gear being axially moved past the outboard set of the gear teeth to mesh with the inboard set of the gear teeth.
Figure 12:
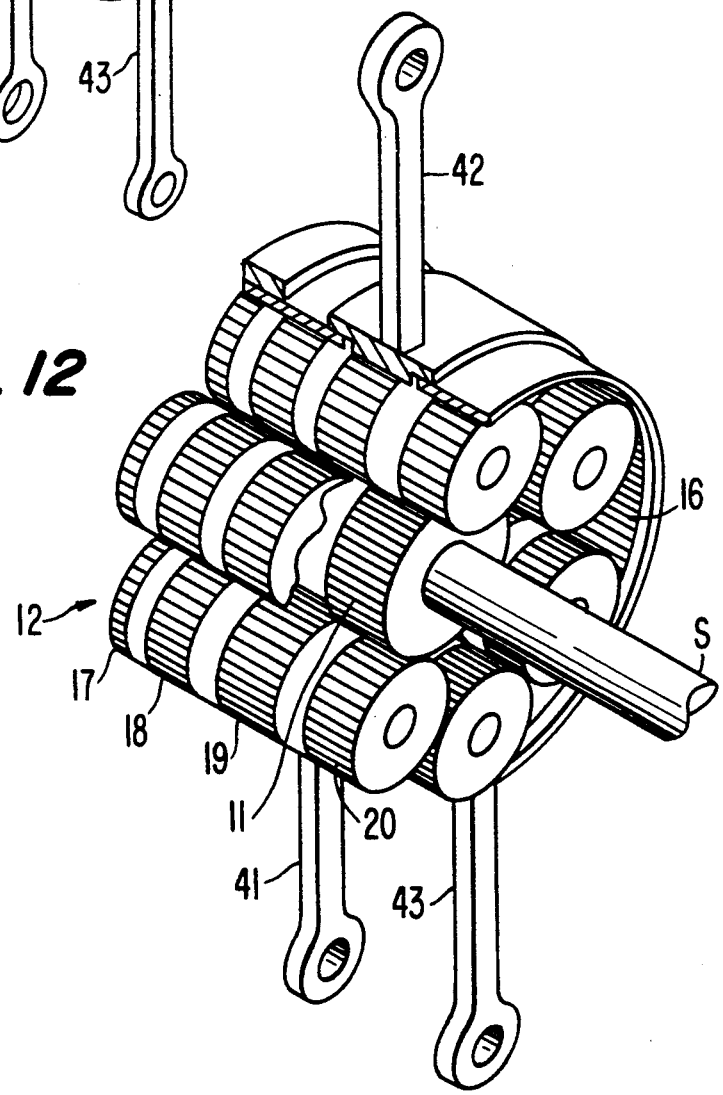
FIG. 12 is an exploded view of the planetary gear assembly of FIG. 9 with the second ring gear being axially moved to slide past the outboard set of gear teeth.

The ring gear 16 is axially moved from the right of FIG. 10 to mesh with the inboard set of gear teeth 20. The ring gear 15 is axially moved past the outboard set of gear teeth 17, inboard set of gear teeth 18 and meshes with the center set of gear teeth 19, with the gear ring 14 being axially moved past the outboard set of gear teeth 17 and meshing with the inboard set of gear teeth 18 as shown in FIG. 11. Then the ring gear 13 is moved axially to mesh with the outboard set of gear teeth 17 completing the assembly of the differential as shown most clearly in FIG. 12.

By virtue of the features of the subject matter of the present invention, it is possible to produce and assemble a geared rotary actuator in an extremely simple manner without any problem relating to an assembly of the inboard mesh ring gear sliding over the outboard planetary gear mesh even with the outboard planetary gear mesh having a larger outboard pitch diameter.

While we have shown and described several embodiments in accordance with the present invention, it is understood that the same is not limited thereto but is susceptible to numerous changes and modifications as known to one of ordinary skill in the art, and we therefore do not wish to be limited to the details shown and described herein, but intend to cover all such modifications as are encompassed by the scope of the appended claims.

We claim:

1. A geared rotary actuator comprising:
    sun gear means coupled to a shaft and including a set of gear teeth;
    a planetary gear assembly including at least one one-piece planetary gear means having a first set of gear teeth meshing with the set of gear teeth of said sun gear means and at least two additional sets of gear teeth axially spaced from said first set of gear teeth and respectively forming an inboard set of gear teeth and an outboard set of gear teeth, at least one tooth of each of said sets of gear teeth being aligned along the axis of the one-piece planetary gear means;
    an inboard ring gear means including a set of gear teeth of a first operating pitch diameter meshing with the inboard set of gear teeth; and
    an outboard ring gear means having a set of gear teeth of a second operating pitch diameter meshing with the outboard set of gear teeth.

2. A geared rotary actuator according to claim 1, wherein the second operating pitch diameter of the set of gear teeth of the outboard ring gear means is larger than the first operating pitch diameter of the set of gear teeth of the inboard ring gear means.

3. A geared rotary actuator according to claim 1, wherein a number of gear teeth of the sets of gear teeth of the inboard ring gear means and outboard ring gear means is identical.

4. A geared rotary actuator according to claim 3, further comprising a center ring gear means including a set of gear teeth meshing with said first set of gear teeth, and wherein a sum of a number of teeth of said set of gear teeth of said center ring means and number of teeth of said first set of gear teeth divided by the number of planetary gear means in an integer.

5. A geared rotary actuator according to claim 1, wherein a number of gear teeth of the sets of gear teeth of the at least one-piece planetary gear means is identical.

6. A geared rotary actuator according to claim 1, wherein the planetary gear assembly includes a plurality of one-piece planetary gear means, each of said one-piece planetary gear means including a first set of gear teeth meshing with the set of gear teeth of the sun gear means, an inboard set of gear teeth meshing with the inboard ring gear means, and an outboard set of gear teeth meshing with said outboard ring gear means.

7. A geared rotary actuator according to claim 6, wherein the second operating pitch diameter of the set of gear teeth of the outboard ring gear means is larger than the first operating pitch diameter of the set of gear teeth of the inboard ring gear means.

8. A geared rotary actuator according to claim 6, wherein a number of gear teeth of the sets of gear teeth of the inboard ring gear means and outboard ring gear means is identical.

9. A geared rotary actuator according to claim 6, further comprising a center ring gear means including a set of gear teeth meshing with said first set of gear teeth, and wherein a sum of a number of teeth of said set of gear teeth of said center ring means and a number of teeth of said first set of gear teeth divided by the number of planetary gear means in an integer.

10. A geared rotary actuator according to claim 6, wherein a number of gear teeth of the sets of gear teeth of the at least one-piece planetary gear means is identical.

11. A geared rotary actuator according to claim 1, wherein the individual teeth of the outboard set of gear teeth and the inboard set of gear teeth are respectively formed as continuous axially extending gear teeth adapted to mesh with the inboard ring means and outboard ring means.

12. A geared rotary actuator according to claim 11, wherein the second operating pitch diameter of the set of gear teeth of the outboard ring gear means is larger than the first operating pitch diameter of the set of gear teeth of the inboard ring gear means.

13. A geared rotary actuator according to claim 11, wherein the planetary gear assembly includes a plurality of one-piece planetary gear means, each one-piece planetary gear means including a first set of gear teeth meshing with the set of gear teeth of the sun gear means, and wherein the individual teeth of the outboard set of gear teeth and inboard set of gear teeth of each of the one-piece planetary gear means are formed as continuous axially extending gear teeth adapted to mesh with the inboard ring means and outboard ring means.

14. A geared rotary actuator according to claim 1, further comprising a center ring means including a set of gear teeth meshing with said first set of gear teeth, wherein a number of teeth of the set of gear teeth of said center ring means is different from a number of the teeth of the inboard set of gear teeth and outboard set of gear teeth.

15. A geared rotary actuator according to claim 14, wherein the number of teeth of the inboard set of gear teeth is less than the number of teeth of the gear teeth of the center ring means and set of teeth of the outboard ring means.

16. A geared rotary actuator according to claim 15, wherein a number of gear teeth of the sets of gear teeth of the at least one-piece planetary gear means is identical.

17. A geared rotary actuator according to claim 14, wherein the number of teeth of the set of gear teeth of the inboard ring means is greater than the number of teeth in the outboard ring gear means and the center ring gear means.

18. A geared rotary actuator according to claim 17, wherein the number of teeth of the set of gear teeth of the center ring gear means is greater than the number of teeth in the outboard ring gear means.

19. A geared rotary actuator according to claim 1, further comprising a further set of gear teeth on said at least one one-piece planetary gear means axially spaced from said first set of gear teeth at a position opposite said two additional sets of gear teeth and forming a further inboard set of gear teeth and a further inboard ring gear means including a set of gear teeth meshing with said further inboard set of gear teeth.

20. A geared rotary actuator according to claim 19, wherein the number of gear teeth of the sets of gear teeth of the first mentioned inboard ring gear means, further inboard ring gear means and outboard ring gear means is identical.

21. A geared rotary actuator according to claim 19, wherein the number of gear teeth of all of the sets of gear teeth of the at least one one-piece planetary gear means is identical.

22. A geared rotary actuator according to claim 19, further comprising a center ring gear means interposed between the first mentioned inboard ring gear means and said further inboard ring gear means and including a set of gear teeth meshing with said first set of gear teeth, and wherein a sum of a number of teeth of said set of gear teeth of said center ring means and number of teeth of said first set of gear teeth divided by the number of planetary gear means is an integer.

23. A method of assembling a rotary geared actuator having a sum gear means, the method comprising the steps of:
   providing a plurality of one-piece planetary gear means each having a first set of gear teeth meshing with the sun gear means, at least two additional sets of gear teeth forming inboard and outboard sets of gear teeth, and with at least one tooth of the first, inboard and outboard set of gear teeth being axially aligned along a length of the respective one-piece planetary gear means,
   providing a first ring gear means having a set of gear teeth with a first operating pitch diameter adapted to mesh with the inboard set of teeth,
   providing at least a second ring gear means having a set of gear teeth with a second operating pitch diameter adapted to mesh with the outboard set of teeth,
   aligning the plurality of one-piece planetary gear means with the axially aligned gear teeth in a mesh position with respect to the respective ring gear means,
   moving the first ring gear means axially past the outboard set of gear teeth, and
   moving the second ring gear means axially to mesh with the outboard set of gear teeth.

24. The method according to claim 23, wherein the sets of gear teeth of the plurality of one-piece planetary gear means have an identical number of teeth.

25. The method according to claim 23, wherein the sets of teeth of the first and second ring gear means have an identical number of teeth.

26. The method according to claim 23, further comprising the steps of:
   providing a center ring gear means having a set of gear teeth adapted to mesh with said first set of gear teeth and,
   axially moving the center ring gear means past the outboard set of gear teeth and inboard set of gear teeth to mesh with said first set of gear teeth prior to the step of axially moving the first ring gear means.

* * * * *